United States Patent
Kamble et al.

(10) Patent No.: US 9,854,470 B2
(45) Date of Patent: *Dec. 26, 2017

(54) PROCESSING OF OVERLAY NETWORKS USING AN ACCELERATED NETWORK INTERFACE CARD

(71) Applicant: International Business Machines Corporation, Armonk, NY (US)

(72) Inventors: Keshav G. Kamble, Fremont, CA (US); Jayakrishna Kidambi, San Jose, CA (US); Vijoy A. Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 143 days.

This patent is subject to a terminal disclaimer.

(21) Appl. No.: 14/606,997

(22) Filed: Jan. 27, 2015

(65) Prior Publication Data

US 2015/0139229 A1 May 21, 2015

Related U.S. Application Data

(63) Continuation of application No. 13/591,134, filed on Aug. 21, 2012, now Pat. No. 8,978,031.

(51) Int. Cl.
*H04W 28/08* (2009.01)
*H04W 40/02* (2009.01)
(Continued)

(52) U.S. Cl.
CPC ........ *H04W 28/08* (2013.01); *G06F 9/45533* (2013.01); *G06F 9/45558* (2013.01);
(Continued)

(58) Field of Classification Search
CPC ....... G06F 9/45558; G06F 2009/45595; G06F 9/45533; H04L 49/70; H04L 12/46;
(Continued)

(56) References Cited

U.S. PATENT DOCUMENTS 7,568,047 B1 * 7/2009 Aysan .................... H04L 45/02
370/352
8,155,146 B1 4/2012 Vincent et al.
(Continued)

OTHER PUBLICATIONS

Clayman et al., "Monitoring Virtual Networks with Lattice," IEEE, Apr. 2010, pp. 239-246.
(Continued)

*Primary Examiner* — Raj Jain
(74) *Attorney, Agent, or Firm* — Zilka-Kotab, P.C.

(57) ABSTRACT

According to one embodiment, a system includes an accelerated network interface card (NIC), the accelerated NIC including a plurality of network ports including multiple Peripheral Component Interconnect express (PCIe) ports, an Overlay Network Offload System (ONOS), the ONOS including logic configured to provide overlay functionality to network traffic received by the accelerated NIC, and logic configured to cause network traffic that has overlay functionality provided by a hypervisor to bypass the ONOS. In another embodiment, a method for accelerating overlay functionality in a server includes providing overlay functionality for at least some network traffic received by an accelerated NIC implemented in a server, wherein the accelerated NIC provides an interface between the server and a network, and causing network traffic that has overlay functionality provided by a hypervisor of the server to bypass the accelerated NIC.

20 Claims, 10 Drawing Sheets

(51) Int. Cl.

| | | |
|---|---|---|
| *G06F 9/455* | (2006.01) | |
| *H04L 12/46* | (2006.01) | |
| *H04L 29/06* | (2006.01) | |
| *H04L 12/18* | (2006.01) | |
| *H04L 12/721* | (2013.01) | |
| *H04L 12/741* | (2013.01) | |
| *H04L 12/931* | (2013.01) | |
| *H04L 29/12* | (2006.01) | |

(52) U.S. Cl.
CPC .............. *H04L 12/18* (2013.01); *H04L 12/46* (2013.01); *H04L 12/4641* (2013.01); *H04L 45/66* (2013.01); *H04L 45/74* (2013.01); *H04L 69/00* (2013.01); *H04L 69/18* (2013.01); *H04W 40/02* (2013.01); *G06F 2009/45595* (2013.01); *H04L 12/4633* (2013.01); *H04L 29/12028* (2013.01); *H04L 49/70* (2013.01)

(58) Field of Classification Search
CPC ................ H04L 12/4633; H04L 45/74; H04L 29/12028; H04L 69/00; H04L 69/18; H04L 12/18; H04L 45/66; H04L 12/4641; H04W 40/02; H04W 28/08; H04W 80/04
USPC .......................................... 370/390, 392, 401
See application file for complete search history.

(56) References Cited

U.S. PATENT DOCUMENTS

| | | | | |
|---|---|---|---|---|
| 8,200,839 | B1* | 6/2012 | Aysan ...................... | H04L 45/02 370/352 |
| 8,978,031 | B2* | 3/2015 | Kamble .............. | G06F 9/45558 370/351 |
| 9,064,058 | B2* | 6/2015 | Daniel .................. | G06F 13/385 |
| 2005/0138620 | A1* | 6/2005 | Lewites ................ | G06F 13/385 718/1 |
| 2011/0107331 | A1 | 5/2011 | Evans et al. | |
| 2011/0134931 | A1 | 6/2011 | Merwe et al. | |
| 2012/0250682 | A1* | 10/2012 | Vincent ............... | H04L 12/4633 370/390 |
| 2012/0250686 | A1* | 10/2012 | Vincent ............... | H04L 12/4633 370/392 |
| 2013/0121159 | A1* | 5/2013 | Anthony, Jr. ......... | H04W 28/08 370/241 |
| 2014/0036690 | A1* | 2/2014 | Berg ..................... | H04W 4/001 370/242 |
| 2014/0047166 | A1* | 2/2014 | Asnaashari ......... | G06F 12/0246 711/103 |
| 2014/0050091 | A1* | 2/2014 | Biswas ................... | H04L 45/64 370/235 |
| 2014/0050218 | A1* | 2/2014 | Kamble ................ | G06F 13/385 370/392 |
| 2014/0059537 | A1 | 2/2014 | Kamble et al. | |

OTHER PUBLICATIONS

IBM, "Network Interface Card(NIC) in Thin-Client Network Computers and Pervasive Network Devices," IP.com, IPCOM000014806D, Jan. 1, 2000, 1 page.

Murphy, M. "Virtual Organization Clusters: Self-Provisioned Clouds on the Grid," Dissertation presented to the Graduate School of Clemson University, May 2010, 182 pages.

Templin et al., "The Internet Routing Overlay Network (IRON)," IP.com, IPCOM000204928D, Mar. 1, 2011, 75 pages.

Non-Final Office Action from U.S. Appl. No. 13/591,134, dated Jun. 4, 2014.

Notice of Allowance from U.S. Appl. No. 13/591,134, dated Oct. 20, 2014.

Kamble et al., U.S. Appl. No. 13/591,134, filed Aug. 21, 2012.

* cited by examiner

PROCESSING OF OVERLAY NETWORKS USING AN ACCELERATED NETWORK INTERFACE CARD

BACKGROUND

The present invention relates to data center infrastructure, and more particularly, this invention relates to accelerated processing of traffic on overlay networks.

Network virtualization is an emerging data center and cloud computing trend which aims to virtualize a network as seen by end stations in a way that greatly simplifies network provisioning in multi-tenant environments, as well as traditional environments. One of the more common techniques of achieving network virtualization is to use network overlays, where tunnels are established between servers, edge network switches, and gateways to which end stations connect. The tunnel is actually implemented by encapsulating packets transmitted by a source end station into an overlay header that transports the packet from the source switch to a target switch in user datagram protocol (UDP) transport via an internet protocol (IP)-based network. The overlay header includes an identifier (ID) that uniquely identifies the virtual network. The target switch (tunnel end point) strips off the overlay header encapsulation, UDP transport header, and IP header, and delivers the original packet to the destination end station via conventional network connections. In addition to this tunneling mechanism, the edge switches participate in an address discovery protocol, which may be learning/flooding based, or lookup-based.

Overlay networks like Virtual eXtensible Local Area Network (VXLAN) connect geographically separated Layer-2 (L2) networks using tunnels. These are L2 over Layer-3 (L3) tunnels. L2 packets originated by a virtual machine (VM) in a VXLAN and destined to another VM or group of VMs in same VXLAN in another physical location are carried over L3 tunnels.

An overlay network may be implemented using a number of VMs with a hypervisor controlling the processing of networking packets in and out of each VM and one or more VMs may be associated with the overlay network. A hypervisor processes the networking traffic associated with each overlay network and/or VM using predefined properties and policies for the corresponding overlay network and/or VM. As the number of overlay networks increases, so does the processing load requirements of the hypervisor. The processing load requirements of the hypervisor include a number of tunnels terminated, management of Virtual Tunnel End Points (VTEPs), address learning per tunnel, packet encapsulation and de-capsulation per tunnel, etc. Therefore, for a given performance level of a network, the number of overlay network or VMs is limited by the hypervisor's processing capabilities. Therefore, there is a need to increase the performance of a hypervisor without increasing the physical resources available that are used by the hypervisor in order to continue to expand the use of overlay networks.

Another issue with overlay networks is attempting to provide support for each virtualization platform's specific implementation requirements. Each virtualization platform, e.g., VMware's Hypervisor, Microsoft's Hyper-V, KVM, etc., requires separate implementation for the overlay network. One problem with current approaches of embedding overlay network mechanisms into virtualization platforms is that issues with performance are created and different standards are necessitated for different virtualization platforms. It also complicates the functionality of overlay networks and adds barriers to interoperability between network virtualization domains on various virtualization platforms.

SUMMARY

In one embodiment, a system includes an accelerated network interface card (NIC), the accelerated NIC including a plurality of network ports including multiple Peripheral Component Interconnect express (PCIe) ports, an Overlay Network Offload System (ONOS), the ONOS including logic configured to provide overlay functionality to network traffic received by the accelerated NIC, and logic configured to cause network traffic that has overlay functionality provided by a hypervisor to bypass the ONOS.

In another embodiment, an accelerated NIC includes a plurality of network ports including multiple PCIe ports configured to communicate with a server and a network, an ONOS having logic configured to provide overlay functionality to at least some network traffic received by the accelerated NIC, and logic configured to cause network traffic that has overlay functionality provided by a hypervisor to bypass the ONOS.

In yet another embodiment, a method for accelerating overlay functionality in a server includes providing overlay functionality for at least some network traffic received by an accelerated NIC implemented in a server, wherein the accelerated NIC provides an interface between the server and a network, and causing network traffic that has overlay functionality provided by a hypervisor of the server to bypass the accelerated NIC.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

By implementing overlay network mechanisms on a network interface card (NIC), according to various embodiments, all the different overlay virtualization platforms are enabled to be used with the same underlying components and programming seamlessly with just the addition of platform specific drivers for the NIC.

In one general embodiment, a system includes an accelerated NIC, the accelerated NIC including a plurality of network ports including multiple Peripheral Component Interconnect express (PCIe) ports and an Overlay Network Offload System (ONOS), the ONOS including logic adapted for providing overlay functionality to network traffic received by the accelerated NIC.

In another general embodiment, an accelerated NIC includes a plurality of network ports including multiple PCIe ports adapted for communicating with a server and a network and an ONOS including logic adapted for providing overlay functionality to network traffic received by the accelerated NIC.

In yet another general embodiment, a method for accelerating overlay functionality in a server includes providing overlay functionality for network traffic received by an accelerated NIC implemented in a server, wherein the accelerated NIC provides an interface between the server and a network.

According to another general embodiment, a computer program product for providing support for an accelerated NIC includes a computer readable storage medium having computer readable program code embodied therewith, the computer readable program code including computer readable program code configured for writing status updates and checking status changes, and computer readable program code configured for managing operations of an accelerated NIC implemented in a server, the accelerated NIC being adapted for providing overlay functionality to network traffic received by the accelerated NIC.

According to yet another general embodiment, a server includes an accelerated NIC including a plurality of network ports including multiple PCIe ports, an ONOS including logic adapted for providing overlay functionality to network traffic received by the accelerated NIC, a first receiving/transmitting (RX/TX) packet buffer adapted for caching network traffic sent to or received from a network, a second RX/TX packet buffer adapted for caching the network traffic received from or sent to the server, and an Ethernet controller adapted for interfacing with the network. The server also includes a hypervisor coupled to one or more virtual machines (VMs), the hypervisor including logic adapted for providing support for the one or more VMs, logic adapted for providing a virtual switch, the virtual switch being adapted for providing switching functionality across the network to network traffic received from or sent to the one or more VMs, and a NIC driver adapted for interfacing with and supporting the accelerated NIC, wherein the NIC driver includes logic adapted for managing operations of the accelerated NIC.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-Ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fiber, etc.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), any virtual networks, or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
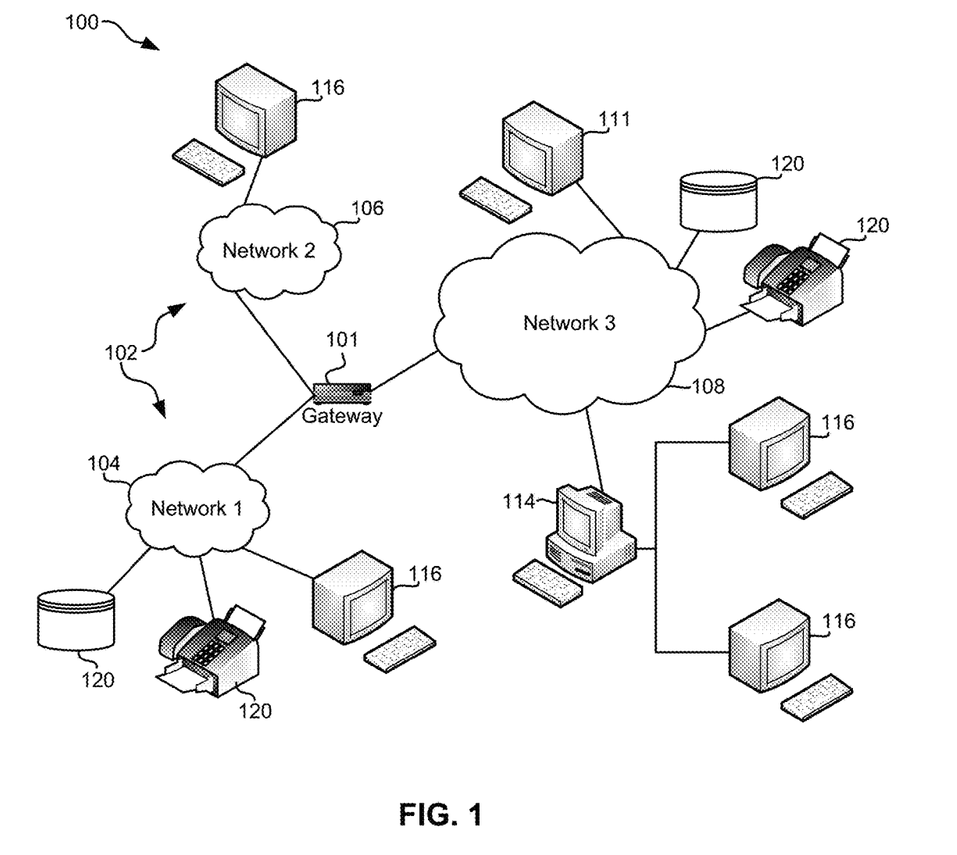
FIG. 1 illustrates a network architecture, in accordance with one embodiment.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a VLAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
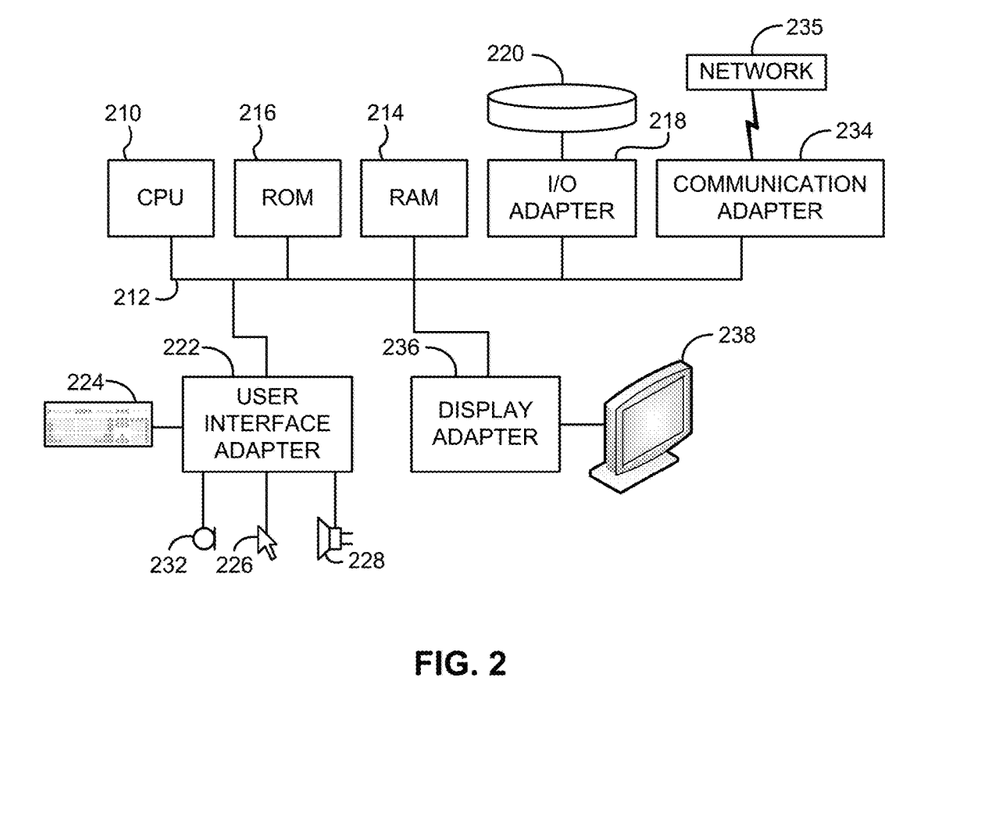
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
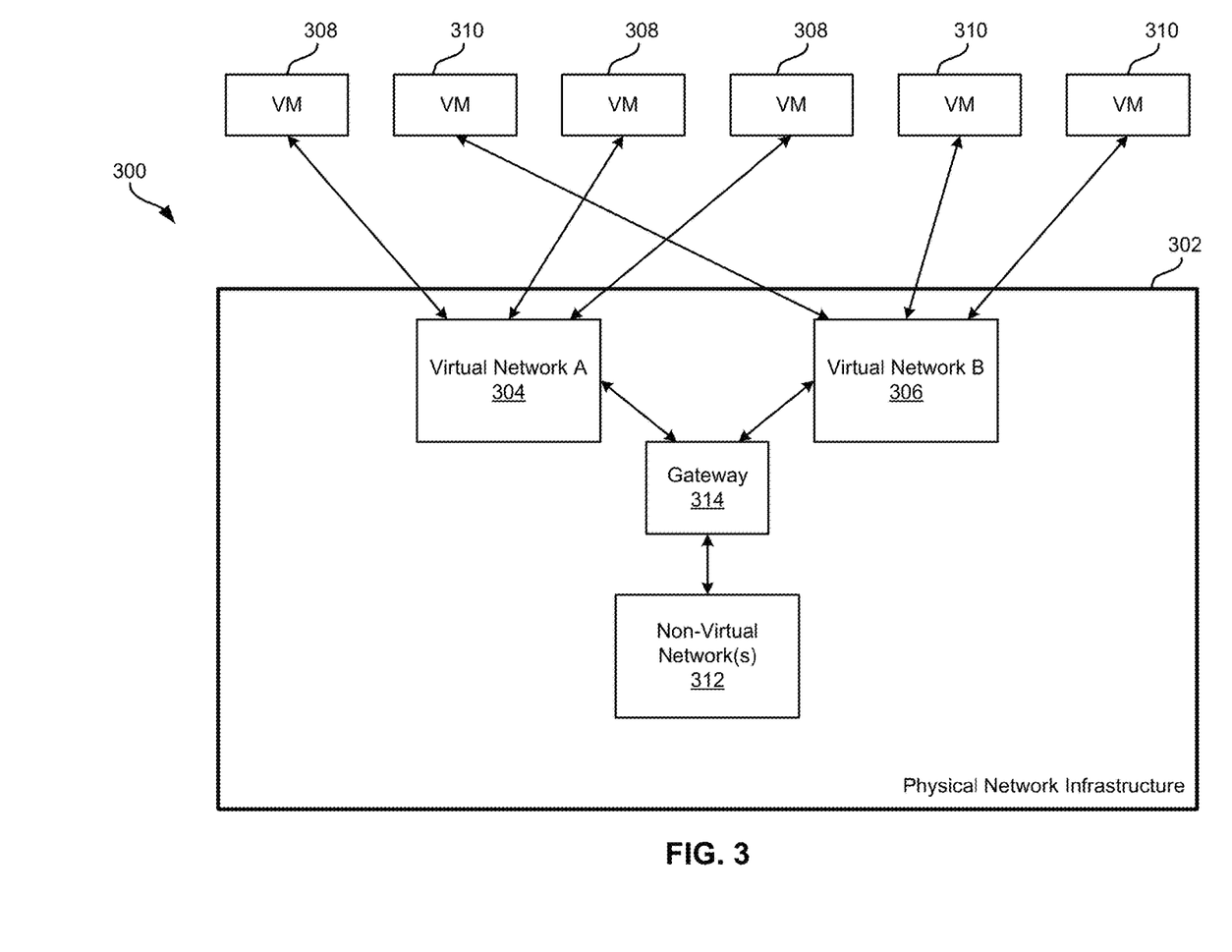
FIG. 3 is a conceptual view of an overlay network, according to one embodiment.

Referring now to FIG. 3, a conceptual view of an overlay network 300 is shown according to one embodiment. In order to virtualize network services, other than simply providing a fabric path (connectivity) between devices, services may be rendered on packets as they move through the gateway 314 which provides routing and forwarding for packets moving between the non-virtual network(s) 312 and the Virtual Network A 304 and Virtual Network B 306. The one or more virtual networks 304, 306 exist within a physical (real) network infrastructure 302. The network infrastructure 302 may include any components, hardware, software, and/or functionality typically associated with and/or used in a network infrastructure, including, but not limited to, switches, connectors, wires, circuits, cables, servers, hosts, storage media, operating systems, applications, ports, I/O, etc., as would be known by one of skill in the art. This network infrastructure 302 supports at least one non-virtual network 312, which may be a legacy network.

Each virtual network 304, 306 may use any number of VMs 308, 310. In one embodiment, Virtual Network A 304 includes one or more VMs 308, and Virtual Network B 306 includes one or more VMs 310. As shown in FIG. 3, the VMs 308, 310 are not shared by the virtual networks 304, 306, but instead are exclusively included in only one virtual network 304, 306 at any given time.

According to one embodiment, the overlay network 300 may include one or more cell switched domain scalable fabric components (SFCs) interconnected with one or more distributed line cards (DLCs).

Components of an overlay network 300 typically identify where to route packets based on a virtual network identifier, referred to as a VNI or VNID. This is typically a 24-bit code or number, which excludes 0x0 and 0xFFFFFF. The overlay network 300 has the capability of tunneling Layer-2 (L2) packets over the Layer-3 (L3) network by encapsulating the L2 packets into an overlay header. This may be performed using virtual extensible local area network (VXLAN) or some other overlay capable protocol, such as locator/ID separation protocol (LISP), overlay transport virtualization (OTV), Network Virtualization using Generic Routing Encapsulation (NVGRE), etc.

The packet may also be encapsulated in a user datagram protocol (UDP) and internet protocol (IP) UDP/IP header. The overlay network 300 may include one or more point-to-point tunnels, and/or point-to-multipoint tunnels. In addition, any of these tunnels may be created, removed, altered and modified based on any number of factors, such as new devices being added to the overlay network 300, removal of devices from the overlay network 300, startup of any end devices, i.e., devices managing tunnel end points, such as virtual overlay network gateways, Hypervisors, switches capable of overlay functionality, etc.

In order for a device to manage a tunnel, there needs to be a mapping between an original packet's source address, destination address, and a tunnel identifier. In this way, a physical server is capable of forwarding the encapsulated original packet to the proper destination device.

In order to increase performance of a virtual networking server using a hypervisor, network traffic processing may be accelerated by utilizing an Overlay Network Offload System (ONOS) within the NIC of the server. In some embodiments, a system may include a NIC with an ONOS, which may be similar to or different from a server, as traditionally known. Specifically, the ONOS may be adapted for managing virtual tunnel end points (VTEPs), address resolution protocol (ARP) cache handling, ARP learning, packet encapsulation and de-capsulation for each overlay network, etc. These functions may be processed exclusively via the ONOS, possibly using separate modules and/or processors, and the processed traffic may be delivered to the hypervisor for final delivery to the appropriate VM(s) or sent down to the overlay network for delivery to a destination VTEP.

Figure 4:
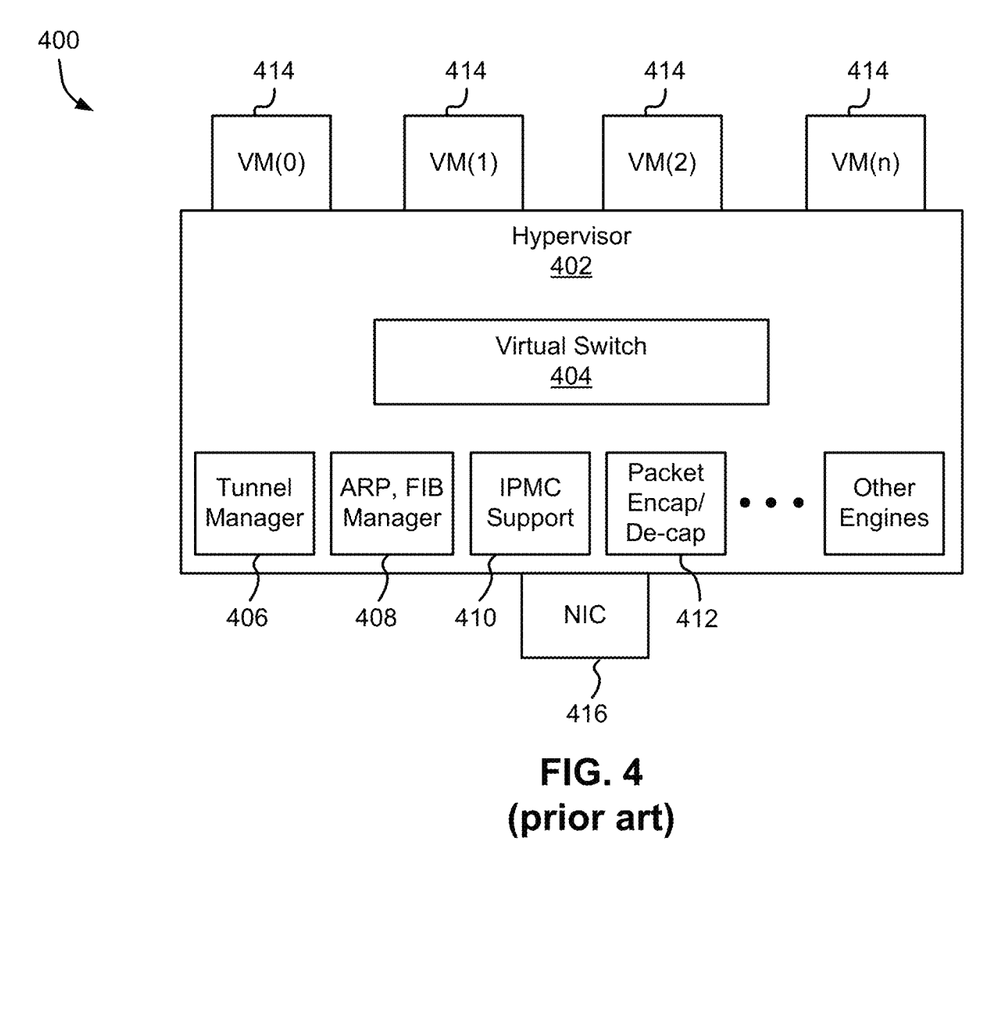
FIG. 4 shows an overlay-capable server, according to the prior art.

With reference to FIG. 4, an overlay-capable server 400 is shown according to the prior art. As shown, the server 400 includes a hypervisor 402 which provides and manages a virtual switch 404. To provide overlay functionality to the server 400, the hypervisor also interacts with a plurality of discrete software engines, such as a tunnel manager 406, an ARP and forwarding information base (FIB) manager 408, an engine for providing internet protocol multicast (IPMC) support 410, a packet encapsulation and de-capsulation engine 412, and any other overlay-enhancing software engines as known in the art. The hypervisor 402 also provides support for any number of VMs 414, shown in FIG. 4 as VM 0, VM 1, VM 2, . . ., VM n. The VMs 414 may be arranged in one or more virtual networks (each virtual network may have a different virtual network identifier (VNID), indicated as VNID 1, VNID 2, VNID 3, etc., in FIG. 4). The number and arrangement of the VMs 414 in the exemplary virtual networks is not meant to be limiting on what configurations are possible, as the Figures only show exemplary arrangements of VMs 414 and virtual networks.

Figure 5:
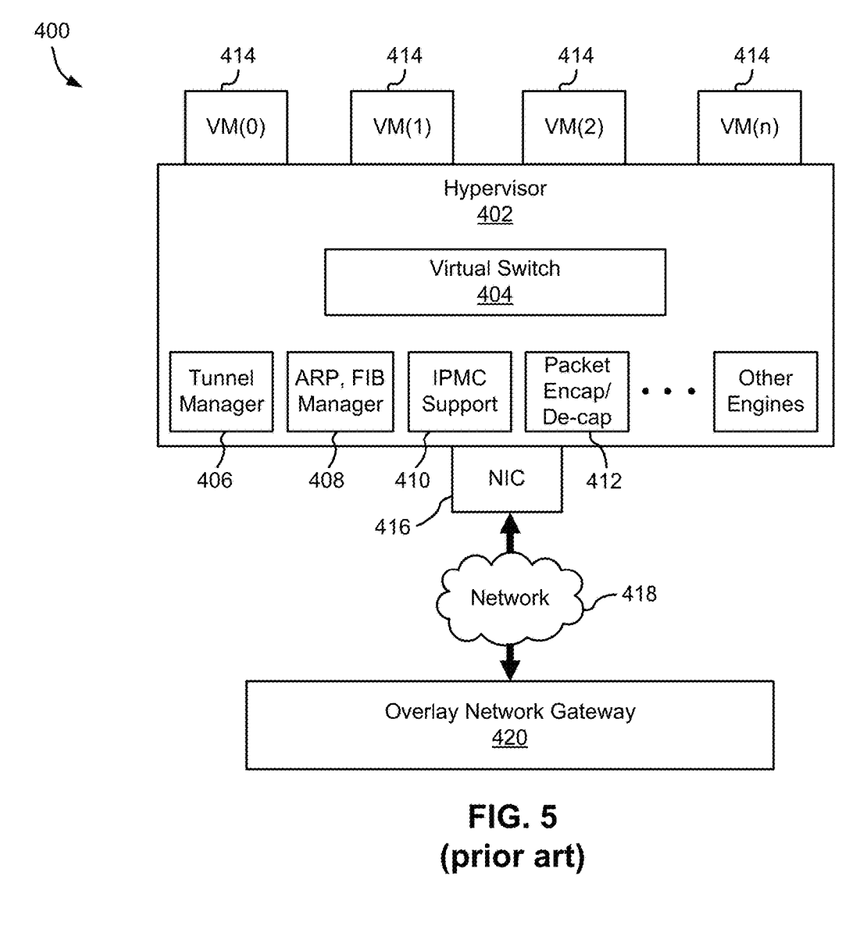
FIG. 5 shows an overlay-capable server connected to an overlay network gateway, according to the prior art

In addition, as shown in FIG. 5 according to the prior art, the server 400 includes a physical NIC 416 which manages and provides for communications between network 418 and the server 400, in one approach. The network 418 may include switches, routers, cables, connections, network devices, etc., as would be understood by one of skill in the art. The NIC 416 includes one or more networking ports adapted for communicating with the network 418 and the server 400. When a packet is encapsulated in an overlay header by the packet encap/de-cap engine 412, the NIC 416 simply passes the packet through to a destination specified in an outer header of the overlay-encapsulated packet.

In order to bridge between virtualized and non-virtualized networks, the packet may be delivered to an overlay network gateway 420, for further forwarding and/or routing outside of the virtual network in which the server 400 is located.

However, as shown in FIGS. 4-5, when the server 400 running the hypervisor 402 is single rooted I/O virtualization (SRIOV) and/or multi-rooted I/O virtualization (MRIOV) compliant, overlay tunneling is not supported, since the NIC 416 does not have visibility to inner packets of any overlay-encapsulated packets that it passes directly to the appropriate VMs 414. Accordingly, in order to alleviate this issue associated with MRIOV and SRIOV, a NIC capable of overlay functionality may be implemented, and is referred to herein as an accelerated NIC.

Figure 6:
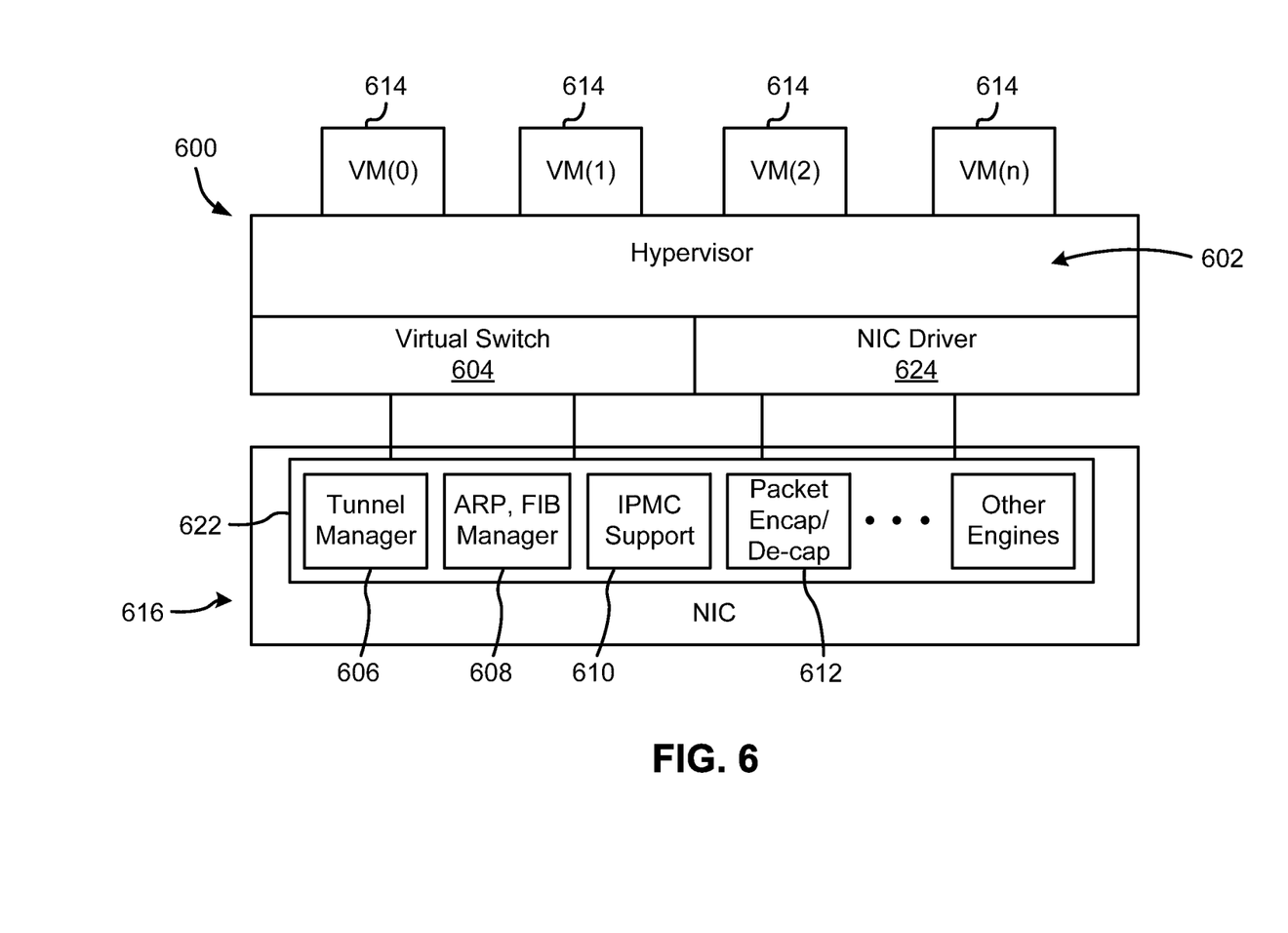
FIG. 6 shows an overlay-capable server using an accelerated network interface card (NIC), according to one embodiment.

Now referring to FIG. 6, a system or server 600 using an accelerated NIC 616 is shown according to one embodiment. The server 600 also comprises a hypervisor 602 which provides and manages a virtual switch 604. The hypervisor 602 also provides support for any number of virtual machines (VMs) 614, shown in FIG. 6 as VM 0, VM 1, VM 2, . . ., VM n. The VMs 614 may be arranged in one or more virtual networks (each virtual network may have a different virtual network identifier (VNID), indicated as VNID 1, VNID 2, VNID 3, etc., in FIG. 6). The number and arrangement of the VMs 614 in the exemplary virtual networks is not meant to be limiting on what configurations are possible, as the Figures only show exemplary arrangements of VMs 614 and virtual networks.

The accelerated NIC 616 makes use of an ONOS 622 within the accelerated NIC 616, such that all overlay functionality is offloaded onto the accelerated NIC 616, in one embodiment. This overlay functionality may be embedded as modules within the accelerated NIC 616, and may include, but is not limited to, tunnel management 606, ARP and FIB management 608, IPMC support 610, packet encap/de-cap 612, and any other overlay-enhancing functionality known in the art.

According to one embodiment, the tunnel manager 606 may be adapted for providing VTEP origination and termination operations and tunnel management operations, and the ARP and FIB manager 608 may be adapted for providing address resolution for packets having an unknown address and forwarding information for packets having a known address. In another embodiment, the IPMC support manager 610 may be adapted for handling multicast packets, forwarding ARP packets over L3 multicast with appropriate IP multicast group addresses, handling IPMC routing entries, and handling multicast membership. In another embodiment, the packet encapsulation and de-capsulation engine 612 may be adapted for encapsulating packets with an overlay header and stripping an overlay header from overlay-encapsulated packets.

In order to provide an interface between the accelerated NIC 616 and the hypervisor 602 in the server 600, a NIC driver 624 may be provided in the server 600 which understands and supports the overlay functionality that has been offloaded to the accelerated NIC 616, and may manage the accelerated NIC 616 accordingly.

In this way, according to one embodiment, in order to adapt a server 600 for use with a different overlay protocol, a NIC driver 624 capable of interfacing with the overlay protocol supported by an installed accelerated NIC 616 may be implemented in the server 600. In one non-limiting example, if a physical server is using the Microsoft Hyper-V virtualization platform, an accelerated NIC capable of overlay acceleration for NVGRE may be installed on the physical server and a full functionality driver for this NIC on Hyper-V may be installed, both of which would enable overlay functionality for Hyper-V based servers. One of skill in the art would recognize that this procedure may be used regardless of the overlay protocol.

In one embodiment, if the server 600 already has a NIC driver 624 installed that is capable of supporting a certain overlay protocol, and an accelerated NIC 616 capable of providing the certain overlay protocol is installed in the server 600, then the accelerated NIC 616 may simply be inserted into an available PCIe slot of the server, and may operate once installed, in a plug-and-play type arrangement.

Figure 7:
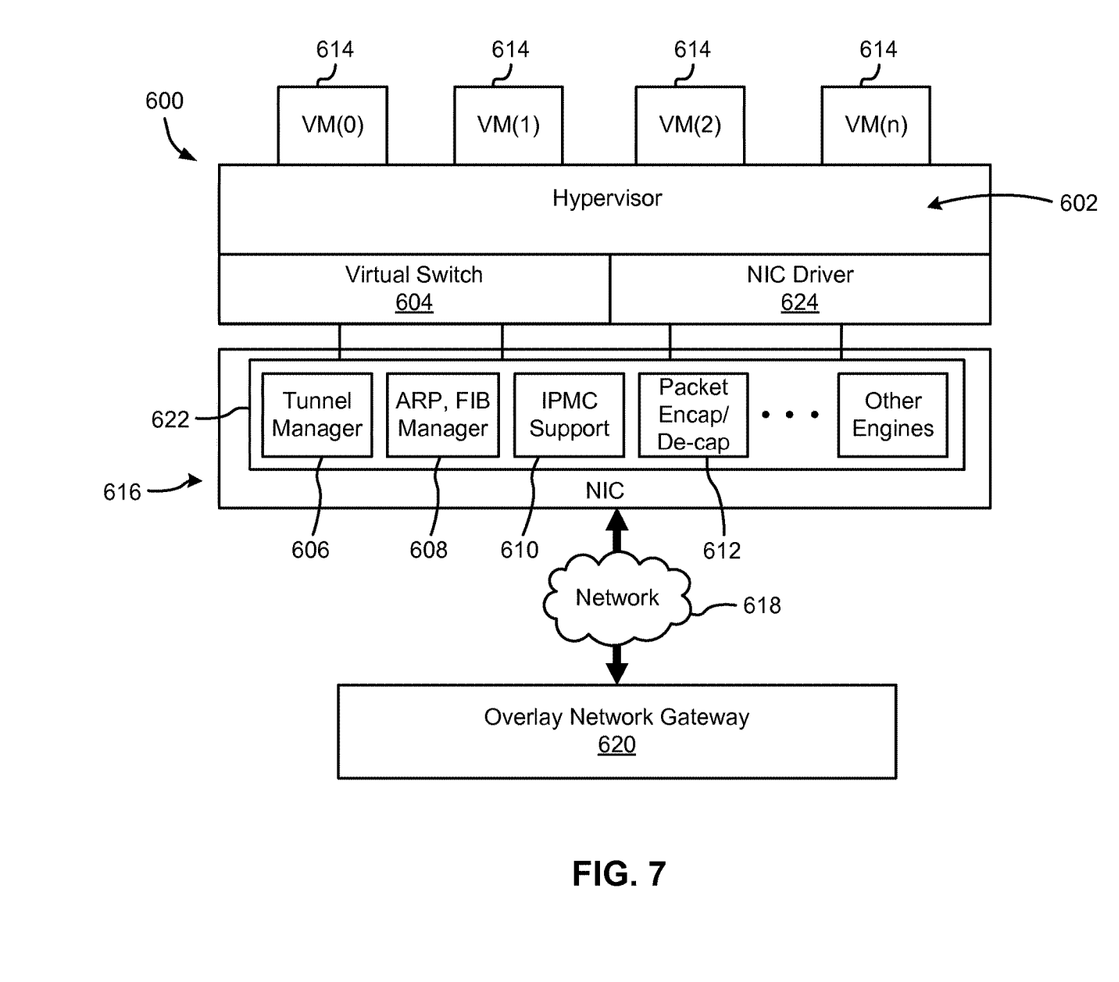
FIG. 7 shows an overlay-capable server using an accelerated NIC connected to an overlay network gateway, according to one embodiment.

As shown in FIG. 7, the accelerated NIC 616 also includes one or more networking ports adapted for communicating with a network 618 and the server 600. In this way, the accelerated NIC 616 provides an interface between the server 600 and the network 618, which may be connected to an overlay network gateway 620 for bridging between virtualized and non-virtualized networks.

In one embodiment, the ONOS 622 may be responsible for processing all overlay network traffic received from the overlay network gateway 620 connected port, and for delivering the processed networking traffic to the hypervisor 602.

Figure 8:
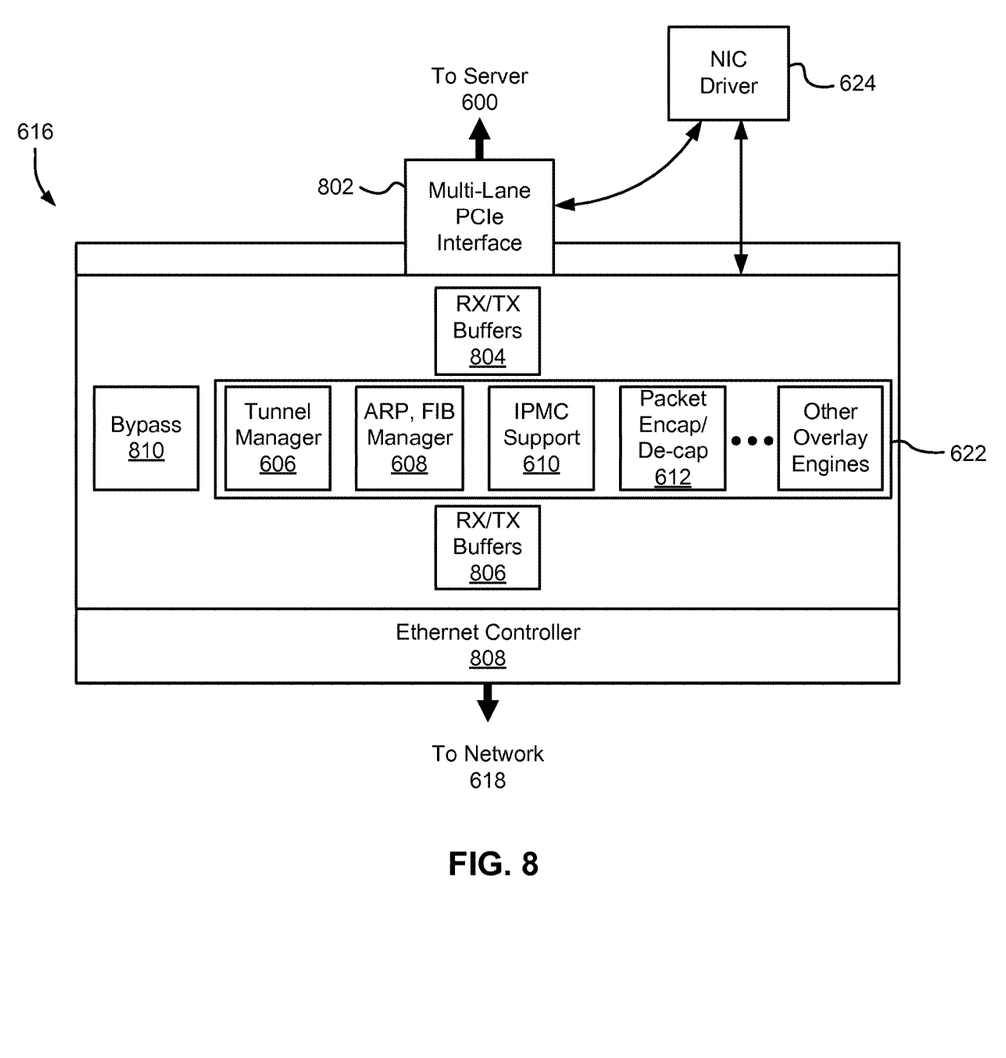
FIG. 8 shows a detailed view of an accelerated NIC, according to one embodiment.

Now referring to FIG. 8, the accelerated NIC 616 is shown in more detail according to one embodiment. The accelerated NIC 616 comprises a multi-lane PCIe interface 802 for interfacing with the server 600, receiving and transmitting (RX/TX) packet buffers 804 for caching traffic to/from the server 600, RX/TX packet buffers 806 for caching traffic to/from the network 618, an Ethernet controller 808 for interacting with the network 618, and the ONOS 622, which may include any number of separate modules for providing overlay functionality, such as tunnel management 606, ARP and FIB management 608, IPMC support 610, packet encap/de-cap 612, and/or any other overlay-enhancing functionality known in the art.

In one embodiment, if the hypervisor comprises logic adapted for providing overlay functionality to network traffic, the accelerated NIC 616 may comprise functionality to allow the network traffic that has overlay functionality provided by the hypervisor to bypass the ONOS 622. This functionality may be provided by having a bypass 810 positioned in parallel to the ONOS 622, as shown in FIG. 8.

According to various embodiments, each module 606, 608, 610, 612, etc., may be implemented by a single processor or a plurality of separate processors, each processor being capable of providing the requisite functionality. The processor(s) may include, but are not limited to, an application specific integrated circuit (ASIC), a field programmable gate array (FPGA), a central processing unit (CPU), a microcontroller (MC), a microprocessor, or some other processor known in the art.

In further embodiments, when each module 606, 608, 610, 612, etc., is implemented in a plurality of separate processors, each processor may be controlled and/or interface with using a separate NIC driver (e.g., one NIC driver for each processor) or by a single NIC driver interfacing with all of the plurality of separate processors, in various embodiments.

Figure 9:
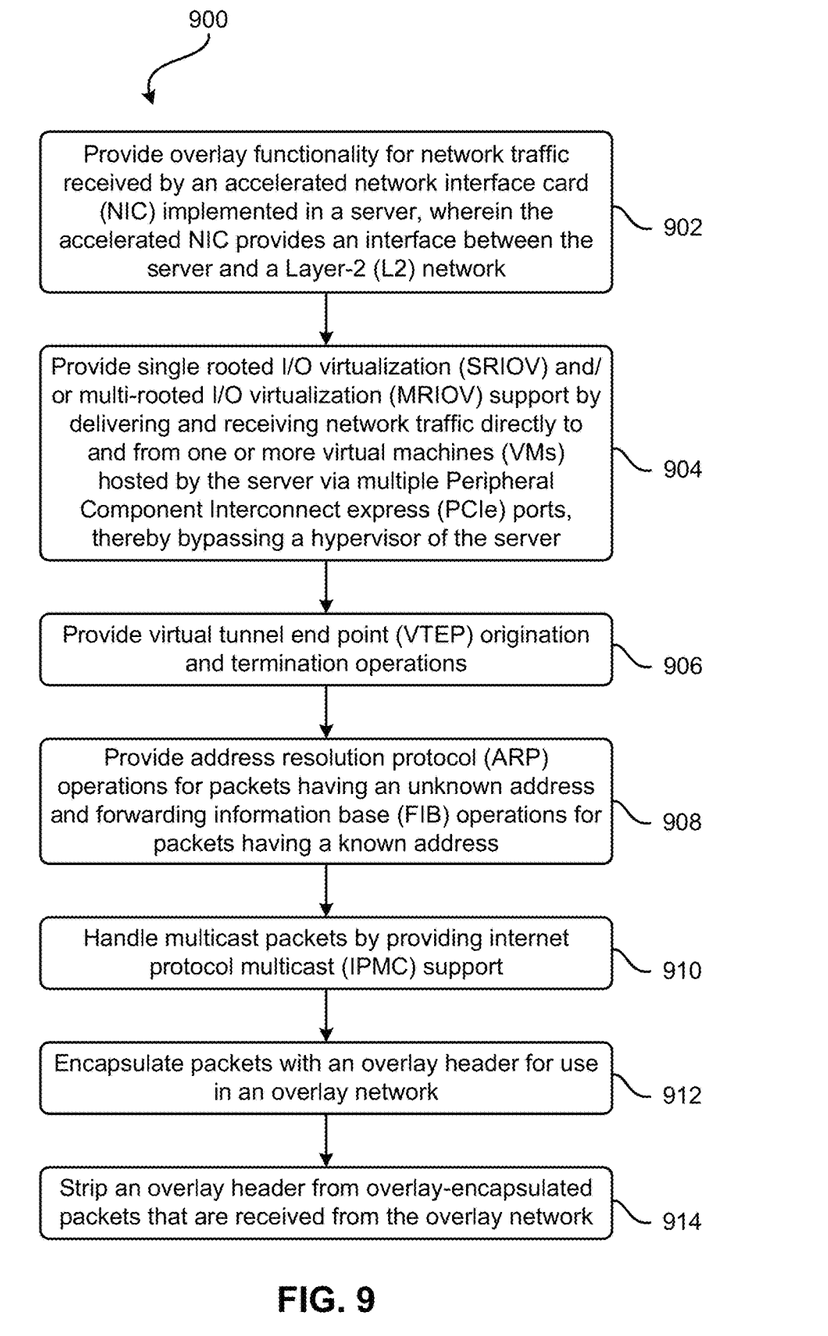
FIG. 9 is a flowchart of a method, according to one embodiment.

Now referring to FIG. 9, a method 900 for accelerating overlay functionality in a server is shown according to one embodiment. The method 900 may be performed in accordance with the present invention in any of the environments depicted in FIGS. 1-8, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in various non-limiting embodiments, the method 900 may be partially or entirely performed by an accelerated NIC which is overlay-capable, a processor (such as a CPU, an ASIC, a FPGA, etc.) which may be embedded in and/or operate within an accelerated NIC, computer program code embedded in a computer readable storage medium within an accelerated NIC, etc.

As shown in FIG. 9, method 900 may initiate with operation 902, where overlay functionality is provided for network traffic received by an accelerated NIC implemented in a server. The accelerated NIC provides an interface between the server and a L2 network.

In optional operation 904, SRIOV and/or MRIOV support may be provided by delivering and receiving network traffic directly to and from one or more VMs hosted by the server via multiple PCIe ports, thereby bypassing a hypervisor of the server.

In optional operation 906, VTEP origination and termination operations may be provided, such as originating or terminating a tunnel between another overlay-capable device, such as an overlay network gateway, another overlay-capable server, etc. In a further embodiment, tunnel management operations may also be provided.

In optional operation 908, ARP operations for packets having an unknown address and FIB operations for packets having a known address may be provided. This allows for address resolution to be performed for packets received by and/or sent from the accelerated NIC.

In optional operation 910, multicast packets may be handled by providing IPMC support. This allows for multicast packets to be received by and/or sent from the accelerated NIC, handling IPMC routing entries, and handling multicast membership. The IPMC support also aids in ARP resolution over overlay networks by encapsulating ARP packets into L3 multicast packets destined to multicast groups corresponding to overlay networks with appropriate IP multicast group addresses.

In optional operation 912, packets may be encapsulated with an overlay header for use in an overlay network. This allows these packets to be sent along a tunnel between overlay-capable devices.

In optional operation 914, an overlay header may be stripped from overlay-encapsulated packets that are received from the overlay network. This allows these received packets to be delivered or forwarded along to their destination.

In a further embodiment, an accelerated NIC may perform the method 900, such as in modules, ASICs, FPGAs, MCs, and/or logic adapted for performing the method 900, in various approaches. The accelerated NIC may store the logic in a memory or a set of registers of the accelerated NIC, in one embodiment.

According to another embodiment, the method 900 may be executed from a computer program product using a processor capable of executing such computer readable program code.

In another embodiment, a computer program product for providing support for an accelerated NIC may include a computer readable storage medium having computer readable program code embodied therewith. The computer readable program code may comprise some or all of: computer readable program code configured for writing status updates and checking status changes and computer readable program code configured for managing operations of an accelerated NIC implemented in a server, the accelerated NIC being adapted for providing overlay functionality to network traffic received by the accelerated NIC.

In this embodiment, the accelerated NIC is implemented in a server and provides overlay functionality to traffic received by and/or sent from the server.

Figure 10:
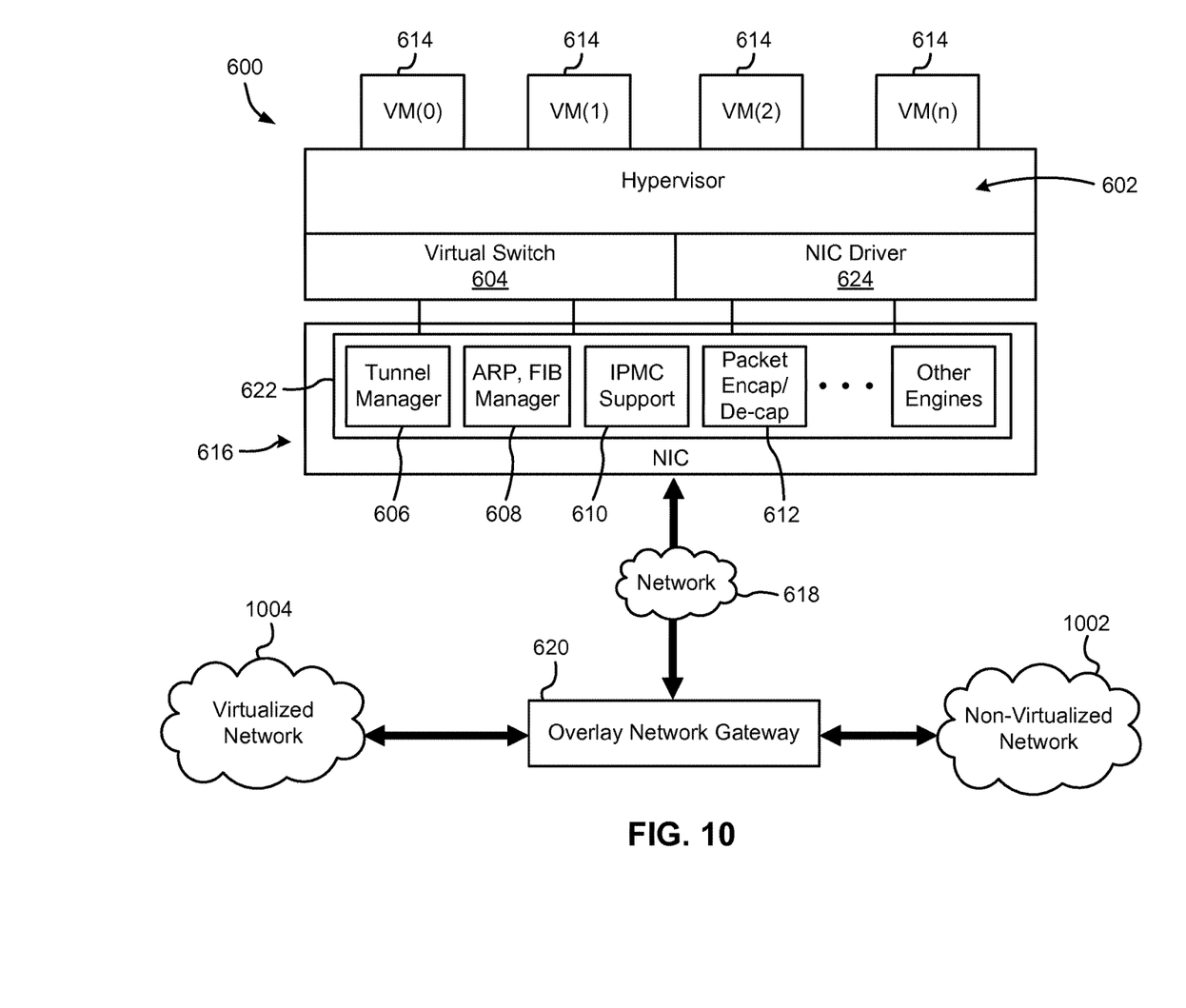
FIG. 10 shows connections for server using an accelerated NIC connected to an overlay network gateway, according to one embodiment.

Now referring to FIG. 10, connections for a server using an accelerated NIC connected to an overlay network gateway are shown, according to one embodiment. FIG. 10 shows connections between an accelerated NIC 616, a server 600, a network 618, an overlay network gateway 620, a virtualized network 1004 and a non-virtualized network 1002 are shown according to one embodiment. As shown, the overlay network gateway 620 acts as a gateway between the network 618 in which the server 600 is located and any other networks, virtualized or non-virtualized. Of course, theoverlay network gateway 620 may also connect to other overlay network gateways, which may in turn be connected to other virtualized and/or non-virtualized networks, as would be understood by one of skill in the art.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:
1. A system, comprising:
 an accelerated network interface card (NIC), the accelerated NIC comprising:
  a plurality of network ports including multiple Peripheral Component Interconnect express (PCIe) ports;
  an Overlay Network Offload System (ONOS), the ONOS comprising logic configured to provide overlay functionality to network traffic received by the accelerated NIC;
  a first receiving/transmitting (RX/TX) packet buffer configured to cache at least one of: network traffic sent to a network and network traffic received from the network; and
  logic configured to cause network traffic that has overlay functionality provided by a hypervisor to bypass the ONOS.

2. The system as recited in claim 1, further comprising the hypervisor coupled to one or more virtual machines (VMs), the hypervisor comprising:
 logic configured to provide support for the one or more VMs;
 logic configured to provide a virtual switch, the virtual switch being configured to provide switching functionality across the network to network traffic received from the one or more VMs and network traffic sent to the one or more VMs; and
 a NIC driver configured to interface with and support the accelerated NIC.

3. The system as recited in claim 2, wherein the accelerated NIC further comprises:
 a second RX/TX packet buffer configured to cache at least one of: network traffic sent to the system and network traffic received from the system; and
 an Ethernet controller configured to interface with the network.

4. The system as recited in claim 2, wherein the hypervisor further comprises logic configured to provide overlay functionality to at least some of: the network traffic received from the one or more VMs and the network traffic sent to the one or more VMs.

5. The system as recited in claim 2, wherein the NIC driver comprises:
 logic configured to write status updates and check status changes; and
 logic configured to manage operations of the accelerated NIC.

6. The system as recited in claim 2, wherein the accelerated NIC further comprises:
 logic configured to provide single rooted I/O virtualization (SRIOV) and/or multi-rooted I/O virtualization (MRIOV) support by delivering and receiving network traffic directly to and from the one or more VMs via the multiple PCIe ports, thereby bypassing the hypervisor.

7. The system as recited in claim 1, wherein the ONOS further comprises:
 a tunnel manager configured to provide virtual tunnel end point (VTEP) origination and termination operations and tunnel management operations;
 an address resolution protocol (ARP) and forwarding information base (FIB) manager configured to provide address resolution for packets having an unknown address and forwarding information for packets having a known address;
 an internet protocol multicast (IPMC) support manager configured to handle multicast packets, forward ARP packets over Layer-3 (L3) multicast with internet protocol (IP) multicast group addresses, handle IPMC routing entries, and handle multicast membership; and
 a packet encapsulation and de-capsulation engine configured to encapsulate packets with an overlay header and strip an overlay header from overlay-encapsulated packets.

8. The system as recited in claim 7, wherein each component of the ONOS is implemented in a separate processor on the accelerated NIC, each separate processor being selected from a group consisting of: an application specific integrated circuit (ASIC), a field programmable gate array (FPGA), and a microcontroller (MC).

9. The system as recited in claim 1, further comprising the hypervisor coupled to one or more virtual machines (VMs), the hypervisor comprising:
   logic configured to provide overlay functionality to at least some of: the network traffic received from the one or more VMs and the network traffic sent to the one or more VMs.

10. An accelerated network interface card (NIC), the accelerated NIC comprising:
    a plurality of network ports including multiple Peripheral Component Interconnect express (PCIe) ports configured to communicate with a server and a network;
    an Overlay Network Offload System (ONOS), the ONOS comprising logic configured to provide overlay functionality to at least some network traffic received by the accelerated NIC;
    a first receiving/transmitting (RX/TX) packet buffer configured to cache at least one of: network traffic sent to the network and network traffic received from the network: and
    logic configured to cause network traffic that has overlay functionality provided by a hypervisor of the server to bypass the ONOS.

11. The accelerated NIC as recited in claim 10, further comprising:
    a second RX/TX packet buffer configured to cache at least one of: network traffic sent to the server and network traffic received from the server; and
    an Ethernet controller configured to interface with the network.

12. The accelerated NIC as recited in claim 10, wherein the accelerated NIC comprises logic configured to interface with a NIC driver on the server.

13. The accelerated NIC as recited in claim 10, wherein the accelerated NIC further comprises logic configured to provide single rooted I/O virtualization (SRIOV) and/or multi-rooted I/O virtualization (MRIOV) support by delivering and receiving network traffic directly to and from one or more virtual machines (VMs) hosted by the server via the multiple PCIe ports, thereby bypassing the hypervisor of the server.

14. The accelerated NIC as recited in claim 9, wherein the ONOS further comprises:
    a tunnel manager configured to provide virtual tunnel end point (VTEP) origination and termination operations and tunnel management operations;
    an address resolution protocol (ARP) and forwarding information base (FIB) manager configured to provide address resolution for packets having an unknown address and forwarding information for packets having a known address;
    an internet protocol multicast (IPMC) support manager configured to handle multicast packets, forward ARP packets over Layer-3 (L3) multicast with internet protocol (IP) multicast group addresses, handle IPMC routing entries, and handle multicast membership; and
    a packet encapsulation and de-capsulation engine configured to encapsulate packets with an overlay header and strip an overlay header from overlay-encapsulated packets.

15. The accelerated NIC as recited in claim 14, wherein each component of the ONOS is implemented in a separate processor on the accelerated NIC, each separate processor being selected from a group consisting of: an application specific integrated circuit (ASIC), a field programmable gate array (FPGA), and a microcontroller (MC).

16. A method for accelerating overlay functionality in a server, the method comprising:
    providing, using an Overlay Network Offload System (ONOS) of an accelerated network interface card (NIC) implemented in a server, overlay functionality for at least some network traffic received by the accelerated NIC, wherein the accelerated NIC provides an interface between the server and a network;
    caching, using a first receiving/transmitting (RX/TX) packet buffer of the accelerated NIC, network traffic selected from a group comprising network traffic sent to the network and network traffic received from the network; and
    causing, by the accelerated NIC, network traffic that has overlay functionality provided by a hypervisor of the server to bypass the ONOS of the accelerated NIC.

17. The method as recited in claim 16, further comprising providing single rooted I/O virtualization (SRIOV) and/or multi-rooted I/O virtualization (MRIOV) support using the accelerated NIC by delivering and receiving network traffic directly to and from one or more virtual machines (VMs) hosted by the server via multiple Peripheral Component Interconnect express (PCIe) ports, thereby bypassing the hypervisor of the server.

18. The method as recited in claim 16, further comprising:
    providing, using the accelerated NIC, virtual tunnel end point (VTEP) origination and termination operations;
    providing, using the accelerated NIC, address resolution protocol (ARP) operations for packets having an unknown address and forwarding information base (FIB) operations for packets having a known address;
    handling multicast packets, using the accelerated NIC, by providing internet protocol multicast (IPMC) support capable of forwarding ARP packets over Layer-3 (L3) multicast with appropriate internet protocol (IP) multicast group addresses, handling IPMC routing entries, and handling multicast membership;
    encapsulating packets with an overlay header for use in an overlay network using the accelerated NIC; and
    stripping an overlay header from overlay-encapsulated packets that are received from the overlay network using the accelerated NIC.

19. The method as recited in claim 16, further comprising providing overlay functionality, using the hypervisor of the server, to at least some of the network traffic received by the accelerated NIC.

20. The method as recited in claim 16, further comprising:
    managing operations of the accelerated NIC using a NIC driver of the server;
    providing, using the accelerated NIC, overlay functionality to first network traffic received from the network; and
    providing, using the hypervisor of the server, overlay functionality to second network traffic received from the network.

* * * * *